United States Patent [19]

Kohler

[11] Patent Number: 5,579,807
[45] Date of Patent: Dec. 3, 1996

[54] SOLENOID-OPERATED PRESSURE CONTROL VALVE

[75] Inventor: William H. Kohler, Ringwood, N.J.

[73] Assignee: Tec Tran Corporation, Mahwah, N.J.

[21] Appl. No.: 305,882

[22] Filed: Sep. 14, 1994

[51] Int. Cl.⁶ .................................................. F15B 13/02
[52] U.S. Cl. .................................. 137/625.65; 303/9.61; 303/9.69; 303/22.8
[58] Field of Search ........................ 137/625.65; 303/9, 303/9.61, 9.69, 22.7, 22.8, 117.1, 128, 132

[56] References Cited

U.S. PATENT DOCUMENTS

| Re. 29,096 | 1/1977 | Jones | 303/100 |
| 5,248,191 | 9/1993 | Kondo et al. | 137/625.65 X |

OTHER PUBLICATIONS

Cagalog SS-1105, "Elwood Proportional Solenoids and Electronics"; Elwood article entitled "What is Proportional Solenoid?", pp. 2–5.
Shindengen Cat. No. X139 entitled "Shindengen Hydraulic Proportional Solenoid Wet Type On–Off Solenoid".
International Publication No. WO91/05195, Published 18 Apr. 1991.

*Primary Examiner*—Gerald A. Michalsky
*Attorney, Agent, or Firm*—David A. Greenlee

[57] ABSTRACT

A hydraulic pressure control valve uses a stepped valve spool having a differential area exposed to supply pressure to provide a small resultant force on the spool. A linear electric solenoid provides a linearly variable force on the valve spool to variably position the spool. In a basic embodiment, the linear solenoid force opposes the resultant supply pressure force to position the spool and control hydraulic outlet pressure. Other embodiments are employed to control brake pressure in a transit car. In a second embodiment, the resultant hydraulic pressure force is opposed by the linear solenoid force to position the spool during normal service braking. Brake pressure is proportioned to car weight by varying current to the linear solenoid. When the transit car emergency brake pipe is dumped, load weigh air pressure and spring forces position the spool in an emergency brake pressure position proportional to car weight. These forces are normally neutralized by emergency brake pipe pressure during service braking. In a third embodiment, the selectively variable linear solenoid force supplements the resultant pressure force to position the valve spool against the force of a spring and load weigh air pressure. This embodiment provides emergency brake pressure proportional to car weight when electric current is cut off to the solenoid.

23 Claims, 8 Drawing Sheets

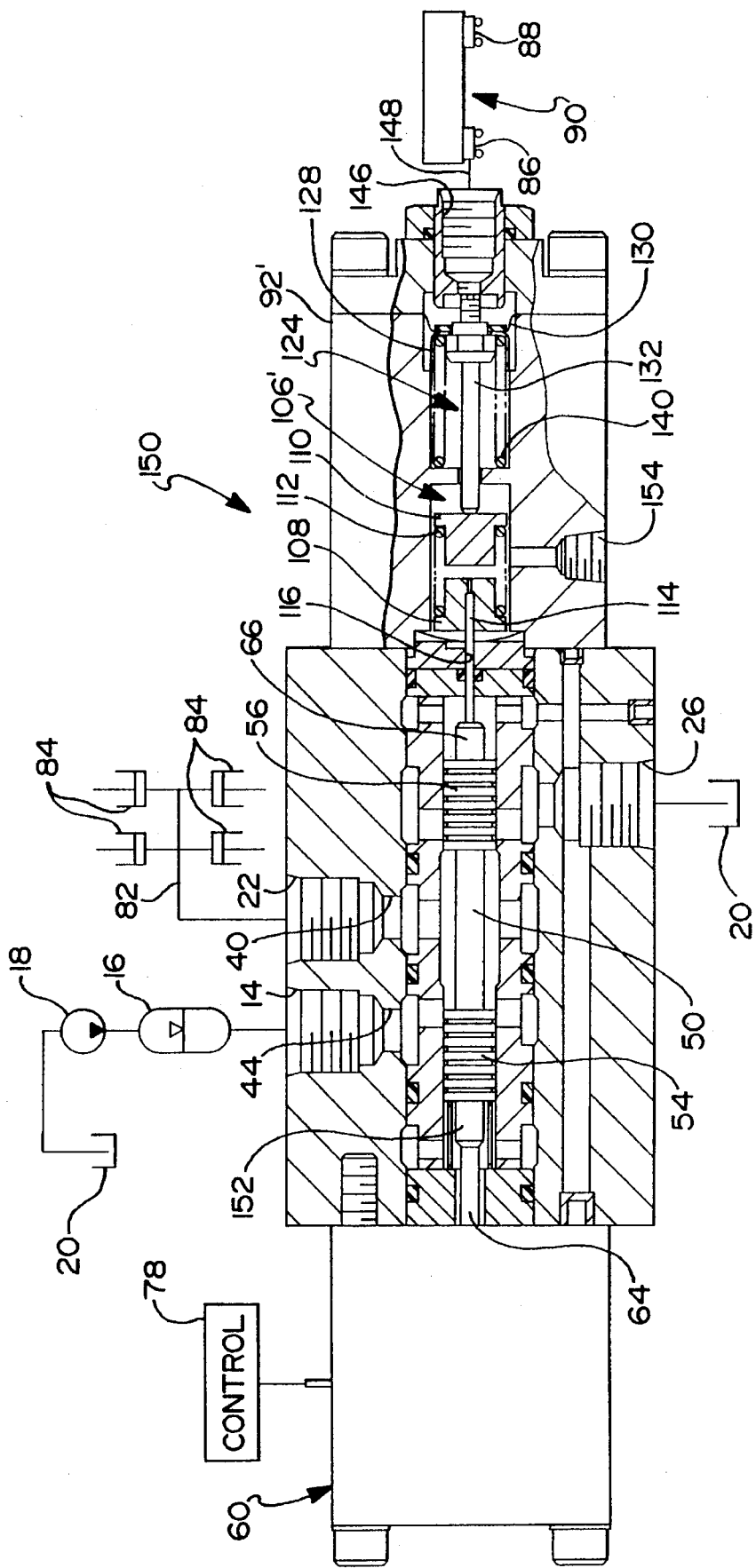

SOLENOID-OPERATED PRESSURE CONTROL VALVE

BACKGROUND OF THE INVENTION

This invention relates generally to pressure control valves and, more particularly, to a pressure control valve operated by a solenoid.

Pressure control valves have long been used to provide a precise pressure in hydraulic applications where maintenance of selectively variable fluid pressures is required. One such application is a hydraulic railway braking system for transit cars, such as are used by the transit cars of the Washington Metropolitan Transit Authority (WMATA). Such a system is illustrated in U.S. Pat. No. Re 29,096—Jones, which is incorporated herein by reference. In the system disclosed in the Jones patent, a brake control valve 5-21 is a pilot-controlled pressure control valve which is operable to provide a variable hydraulic pressure to the brakes 6-0 to provide varying levels of braking, or brake rates. Such systems can be either hydraulic-apply, spring-release, or spring-apply, hydraulic-release systems.

The pressure control valves used on WMATA transit cars are typical of most pressure control valves in general in that it is pilot-controlled. In such a pilot-controlled valve, brake or outlet pressure acting on the end of the valve spool is opposed by a hydraulic pilot pressure which is selectively variable to control outlet pressure, which controls braking level or force. Such valves have long been used in a variety of industrial applications. However, such valves require a constant pilot fluid flow to maintain proper pilot pressure, which is normally non-problematical in an industrial application.

However, in a transit application, this constant pilot flow can be problematical. In WMATA transit cars, a drop in the pressure of the pilot fluid results in a fail-safe automatic application of the car's emergency brakes. This pilot pressure is supplied from an accumulator which also supplies the main brake pressure fluid. The accumulator is continually drained to provide pressure fluid for valve and brake operation and must be periodically replenished by operation of an electric pump. This pump is powered by electric current derived from the transit system's "third rail", which provides electric power through a pickup shoe to the transit car for propulsion, lighting, braking and other functions.

Since a plurality of power stations provide third rail power to a plurality of isolated power zones in the transit system, the third rail is not continuous. If a transit car is stopped where a car's third rail pickup shoe is in one of these third rail gaps, all power is cut off to the car, except power from the car's battery. If the interval of car stoppage in the third rail gap is sufficiently long, the accumulator supplying pilot pressure fluid to the brake control valve will drain until insufficient pressure is available and the car's brakes will automatically go into emergency braking.

Thus the car and the train will be immovable until the brakes on the affected car are "cut out". This removes all braking on that car and reduces the total braking available to the train. A train so crippled cannot be used in regular revenue service until power can be restored. This is usually at least a fifteen minute procedure, during which all transit operations in that portion of the system are delayed. Thereafter, the braking on the affected car will have to be manually "cut in" to render the train's braking system whole again.

Such a situation is a major inconvenience to operation of the transit system in terms of both time and expense.

As stated above, use of a pilot-controlled brake control valve requires a constant flow of pilot fluid to maintain the predetermined pilot pressure. The pilot flow requirements of this pilot flow brake control valve and the limited size of the accumulator used on WMATA transit cars require the use of a pump driven by a 1 horsepower motor that cycles every 3 minutes in normal usage to replenish the accumulator. This rapid cycling of the pump causes such wear and tear on the pumps as to necessitate frequent replacement of the pumps. Rapid pump cycling consumes substantial electric energy and is very energy inefficient.

A further inconvenience of the current pilot-controlled brake control valve in use on WMATA transit cars occurs during movement of a car into the maintenance shops. During such movement, the cars move off third rail power into a propulsion "coast" mode. If this occurs just before the accumulator calls for recharge, no recharge is possible thereafter and a call for braking can dump the car into emergency braking mode. It is then necessary to provide power to the car from a mobile source, causing delay and inconvenience.

It would be desirable to provide a pressure control valve which is energy efficient.

It would also be desirable to provide a pressure control valve which drastically reduces or eliminates the need for a constant pilot fluid flow.

It would be further desirable to provide a pressure control valve for use as a transit brake control valve which so drastically reduces the accumulator drainage that the frequency of replenishment cycle intervals is drastically reduced and a much smaller replenishment electric motor can be used.

SUMMARY OF THE INVENTION

It is therefore an object of this invention to provide a pressure control valve which is energy efficient.

It is also an object of this invention to provide a pressure control valve which drastically reduces or eliminates the need for a constant pilot fluid flow.

It is a further object of this invention to provide a pressure control valve for use as a transit brake control valve which so drastically reduces the accumulator drainage that a much smaller replenishment electric motor can be used.

A proportional electric device is an electric operator having an output member which exerts a force that is proportional to input current over a range of output member travel. Devices exhibiting these linear proportional characteristics are solenoids manufactured by Shindengen Co. of Tokyo, Japan, and by Elwood Hydraulics Co. of Oak Creek, Wis. These solenoids are analog devices which each have a two-range stroke that include a linear range in which force output is substantially constantly proportional to current input. This contrasts to a conventional solenoid which is a digital device which is either energized or deenergized.

These linear proportional solenoids have found usage in the hydraulics industry as flow control valves, such as fuel control valves, in which volumetric flow through a valve is varied by varying solenoid current. Applicant has discovered that linear proportional valves can be used in a pressure control valve to control fluid pressure in a controlled device (e.g. hydraulic vehicle brakes) by variably controlling current to the solenoid. Solenoid forces are opposed by a force produced by fluid pressure acting against a spool land to variably connect the controlled device to either a source of pressure fluid or to the reservoir, thus providing the desired pressure in the controlled device.

In one aspect, this invention features a fluid pressure control valve comprising a body having a stepped bore with inlet, outlet and tank ports and a stepped spool slidable in the bore and having opposed first and second valving lands. The first land has an effective area larger than the area of the second land by a differential area. The spool is movable between a fill position connecting the inlet and outlet ports and a drain position connecting the outlet and drain ports. The lands are exposed to outlet pressure fluid which biases the spool toward drain position by a fluid pressure force that is produced by outlet fluid pressure acting on the differential area. A proportional linear electric solenoid engages the spool with a selectively variable solenoid force to selectively vary the fluid pressure force to selectively position the spool.

In another aspect, this invention features a fluid pressure control valve for controlling fluid pressure in a hydraulic device comprising a body having a stepped bore which has an inlet port connected to a source of pressure fluid, an outlet port connected to the hydraulic device, and a drain port connected to a hydraulic reservoir. A stepped spool, having opposed first and second valving lands, is slidable in the bore. The first land has an effective area larger than the effective area of the second land by a differential area. The spool is movable between a fill position connecting the inlet and outlet ports and a drain position connecting the outlet and drain ports. The lands are exposed to outlet pressure fluid which biases the spool toward drain position by a first force produced by outlet fluid pressure acting on the differential area. A second force on the spool opposing the first force to bias the spool toward fill position is supplied by means including a selectively variable proportional linear electric solenoid, which has an output rod engaging the spool with a solenoid force that is proportional to current input and is substantially constant over the range of rod travel, for selectively varying the second force to selectively position the spool and vary the fluid pressure in the hydraulic device.

Preferably, the second force means includes a spring which engages the output rod to selectively increase the solenoid force and control means for varying the spring force.

In yet another aspect, this invention features a fluid pressure control valve for controlling brake operators in a transit car which has a source of pneumatic pressure indicating car weight. The valve comprises a body having a stepped bore which has an inlet port connected to a source of pressure fluid, an outlet port connected to the brake operators, and a drain port connected to a hydraulic reservoir. A stepped spool is slidable in the bore and has opposed first and second valving lands, the first land having an effective area larger than the area of the second land by a differential area. The spool is movable between a fill position connecting the inlet and outlet ports and a drain position connecting the outlet and drain ports. The lands are exposed to outlet pressure fluid which biases the spool toward drain position by a first force produced by outlet fluid pressure acting on the differential area. A second force acting on the spool opposing the first force to bias the spool toward fill position is provided by second force means which includes a selectively variable proportional linear electric device and biasing means, each of which is independently operable to selectively vary the second force to selectively position the spool.

Preferably, the biasing means includes a spring engaging one end of the spool to selectively increase the second force and a pneumatic operator connected to the supply of pneumatic pressure for increasing spring pressure in direct proportion to pneumatic pressure to vary the spring force. Also, the electric device is a proportional linear solenoid having an output rod engaging the other end of the spool with a variable solenoid force opposing the force, the solenoid force being proportional to current input and substantially constant over the range of rod travel.

In a further aspect, this invention features a fluid pressure control valve for controlling brake operators in a transit car which also has a pneumatic emergency brake pipe in addition to the pneumatic load weigh device. The second force means includes a pneumatic brake pipe operator which responds to the supply of brake pipe pressure to release the spring force and responds to the removal of brake pipe pressure to apply the spring force.

Preferably, the second force means includes a mechanical adjustment for adjusting the spring force.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 9 is a view similar to FIG. 7, with the spool illustrated in brake apply position.

DETAILED DESCRIPTION OF PREFERRED EMBODIMENTS

Figure 1:
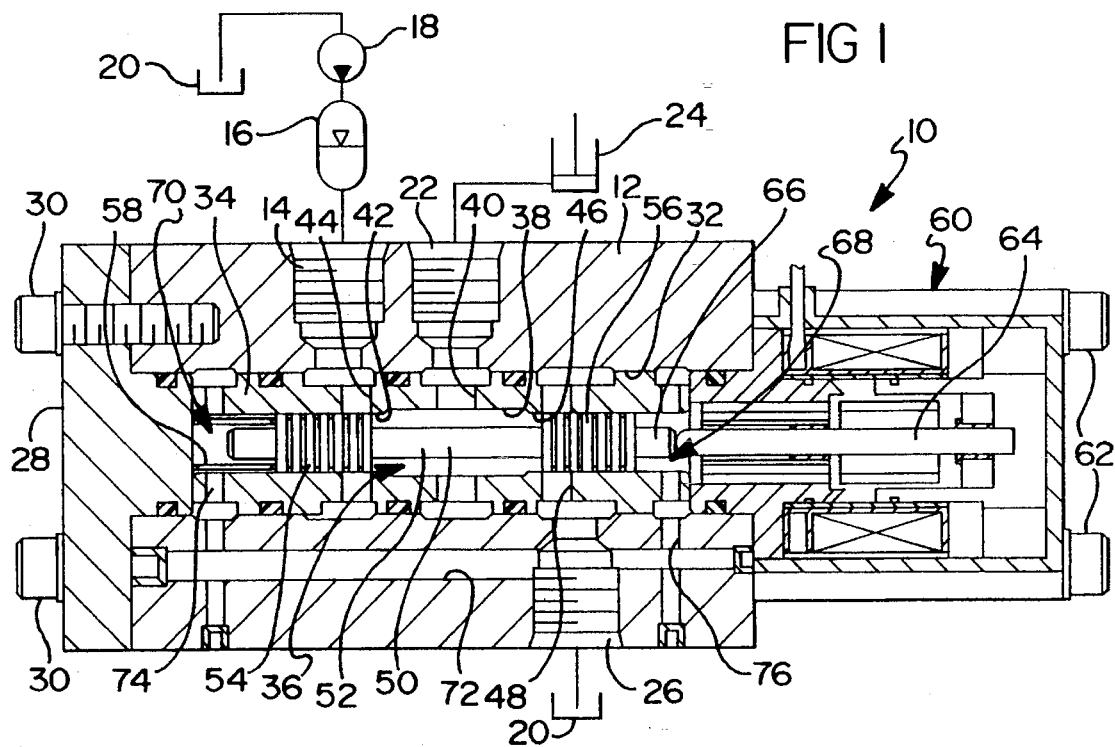
FIG. 1 is a sectional view of one embodiment of a pressure control valve according to this invention, with the spool illustrated in neutral position.
Figure 2:
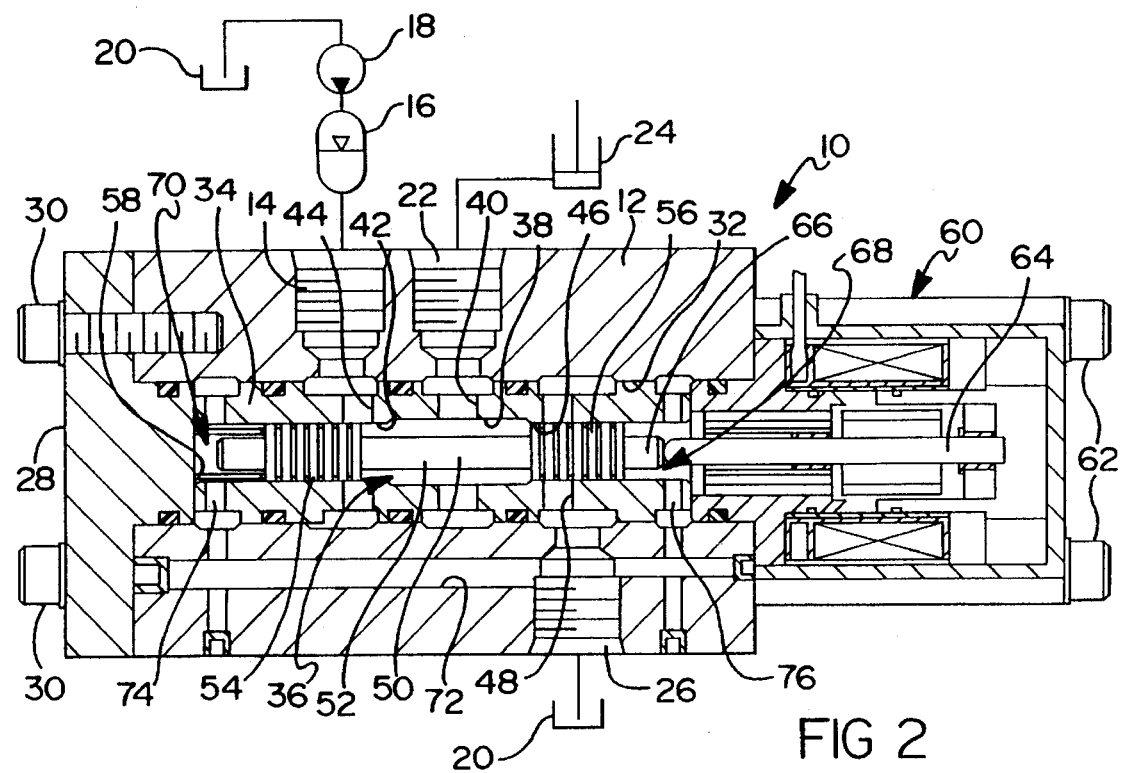
FIG. 2 is a view similar to FIG. 1, with the spool illustrated in fill position.
Figure 3:
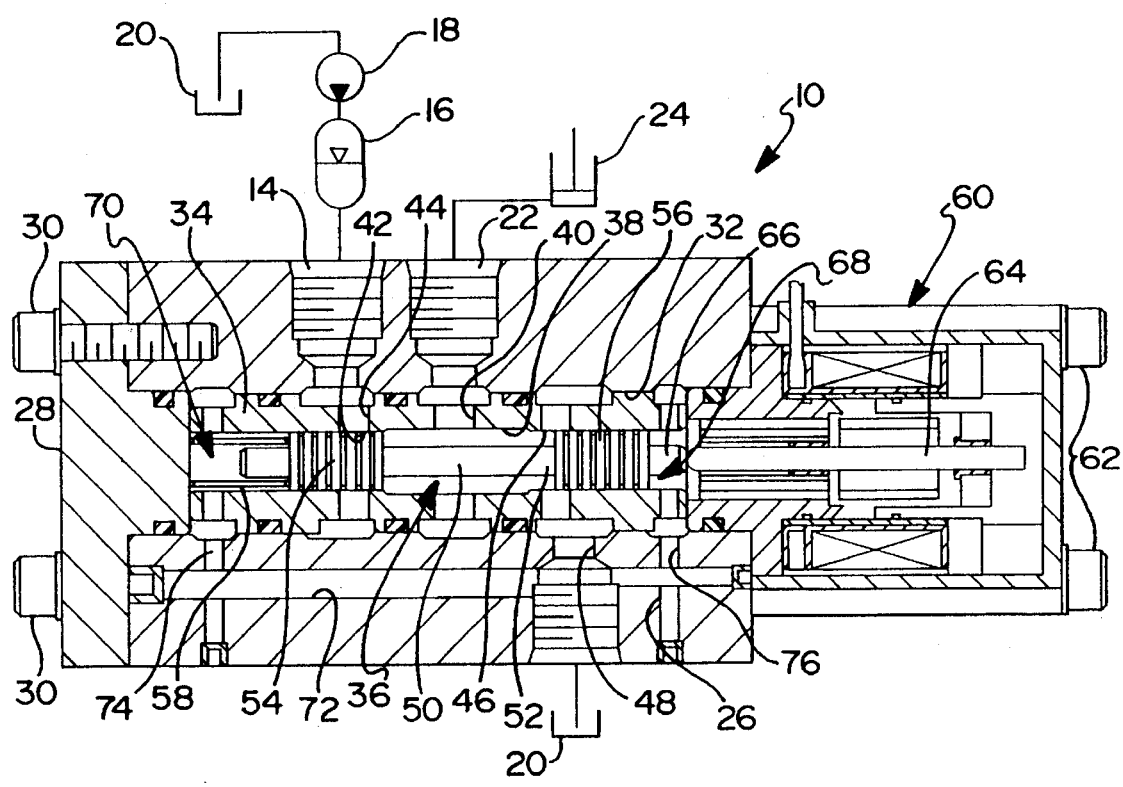
FIG. 3 is a view to similar to FIG. 1, with the spool illustrated in drain position.

Referring now to FIGS. 1–3 of the drawings, one embodiment of this invention comprises a pressure control valve 10 which includes a valve body 12 that includes an inlet port 14. A pressure accumulator 16 connects to inlet port 14 and is supplied with pressure hydraulic fluid from a pump 18 that draws from a reservoir 20. Valve body 12 further includes a pressure port 22 that is connected to a hydraulic actuator shown here as a single acting cylinder 24. Valve body 12 also includes a drain port 26 connected to reservoir 20. Valve 10 is provided to control hydraulic pressure in cylinder 24.

An end cap 28 is attached to one end of valve body 12 by cap screws 30 to close one end of a central chamber 32 which receives an insert 34 having a stepped bore 36. An intermediate portion 38 of stepped bore 36 is connected to pressure port 22 by a pressure passage 40 in insert 34. A small end portion 42 of stepped bore 36 is connected to inlet port 14 by an inlet passage 44 in insert 34. Stepped bore 36 includes a large end portion 46 which connects through a drain passage 48 to drain port 26.

A valving spool 50 is received in stepped bore 36, and includes a small land 54 slidable in small end portion 42 of bore 36 and a large land 56 slidable in large end portion 46 of bore 36. A light stabilizing compression spring 58 engages land 54 to bias spool 50 outwardly of bore 36. A linear electric device 60 closes the other end of valve body 12 and is secured by cap screws 62. Linear electric device 60 has an output plunger 64 that engages the outer end 66 of spool 50.

The end chambers 68 and 70 of stepped bore 36 are connected by drilled drain passages 72, 74 and 76 to drain port 26. This assures that there are no pressure forces acting on the ends of valve spool 50. The only forces acting on valve spool 50 to position it within stepped bore 36 are the light force exerted by spring 58, the force exerted by plunger 64, and the resultant pressure forces acting on the differential area of spool lands 54 and 56, as will now be explained.

Accurate positioning of spool 50 within pressure control valve 10 requires a very small output force from linear device 60. The relative sizes of lands 54 and 56 and hydraulic pressure define the output force required of linear device 60. Linear device 60 is preferably a solenoid valve of the type known as a proportional solenoid valve. Such valves are commercially available from Elwood Hydraulic Company, Inc., Milwaukee, Wis. and from Shindengen America Inc., Rolling Meadows, Ill.

Proportional solenoid valves differ from conventional solenoid valves in having two ranges of output plunger stroke. During the short approach stroke, output force is dependent on stroke length. During the longer control stroke (e.g. 0.080 in.), output force is a substantially linear function of current supplied. The commercially available solenoids have outputs in the range of 1–17 lb. produced in response to an input of up to 1 amp during the control stroke. A lower current input will produce a proportionally lower force output.

The proportional solenoid type of actuator is utilized in its control stroke in this invention, so that output force is directly proportional to solenoid amperage. Hence, it is referred to herein as a linear electric device or a linear solenoid. Such solenoids have been previously used in flow control valves, but not in the pressure control valve application of this invention, where it is illustrated as controlled by a conventional electric controller (not shown).

In one example of pressure control valve 10, a 0.375 in. diameter spool is used, the area of small spool 54, $A_L$ is 0.100 in$^2$, and the area of large spool land 56, $A_s$ is 0.1143 in$^2$. This yields a differential area $A_\delta$ of 0.0143 in$^2$. At 1000 psi hydraulic pressure, this produces a force of 14.3 lb. biasing spool 50 rightward toward linear solenoid 60, as viewed in FIGS. 1–3. Higher and lower pressures would produce proportionally higher and lower forces. If the force of stabilizing spring 58 is 0.1 lb., the total force on spool 50 would be 14.4 lb.

Operation of linear solenoid 60 to control pressure in actuator 24 will now be described. If current supplied to linear solenoid 60 from an electrical controller 78 is such to produce a force output of 14.4 lb., spool 50 will be centered in the neutral position of FIG. 1, with pressure port 22 isolated from both inlet port 14 and drain port 26. An increase of current to linear solenoid 60 will cause plunger 64 to shift spool 50 leftward to the fill position of FIG. 2, connecting pressure port 22 with supply port 14. This will pressurize cylinder 24. When a predetermined pressure in cylinder 24 is reached, a conventional transducer (not shown) in cylinder 24 will supply feedback to electrical controller 78 in a well-known manner and reduce current to linear solenoid 60 to return spool 50 rightward to the FIG. 1 neutral position.

If it is desired to reduce pressure in cylinder 24, current to linear solenoid 60 is reduced to produce an output force lower than the combined differential hydraulic and spring forces. This will shift spool 50 rightward toward linear solenoid 60 to the drain position of FIG. 3, connecting pressure port 22 with drain port 26. This will depressurize cylinder 24 until a predetermined pressure is reached, whereupon controller 78 will increase current to linear solenoid 60 and return spool 50 to the neutral position of FIG. 1.

Figure 4:
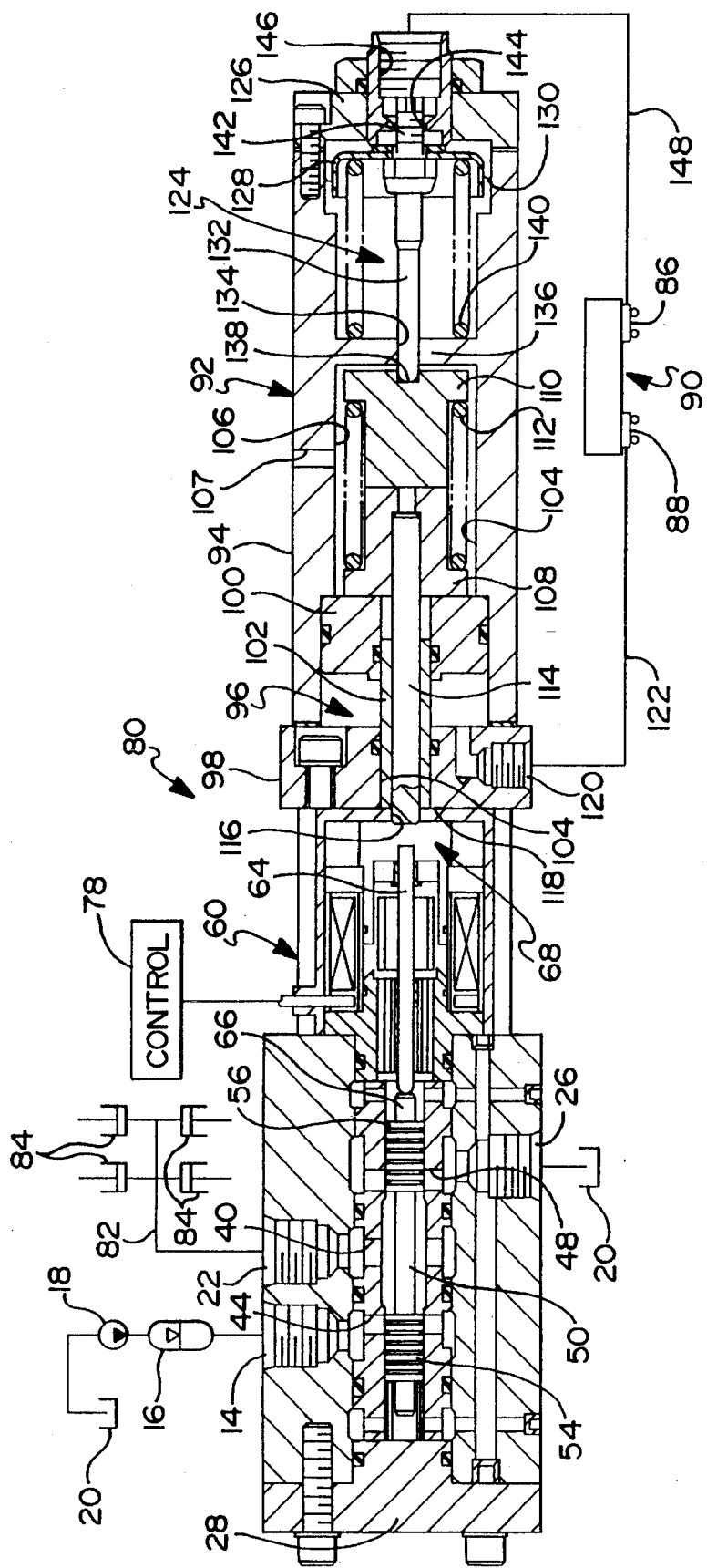
FIG. 4 is a sectional view of another embodiment of a pressure control valve according to this invention, shown in a transit car hydraulic system and having a pneumatic controller, with the spool illustrated in neutral position and the pneumatic controller held inoperative by brake pipe pressure.
Figure 5:
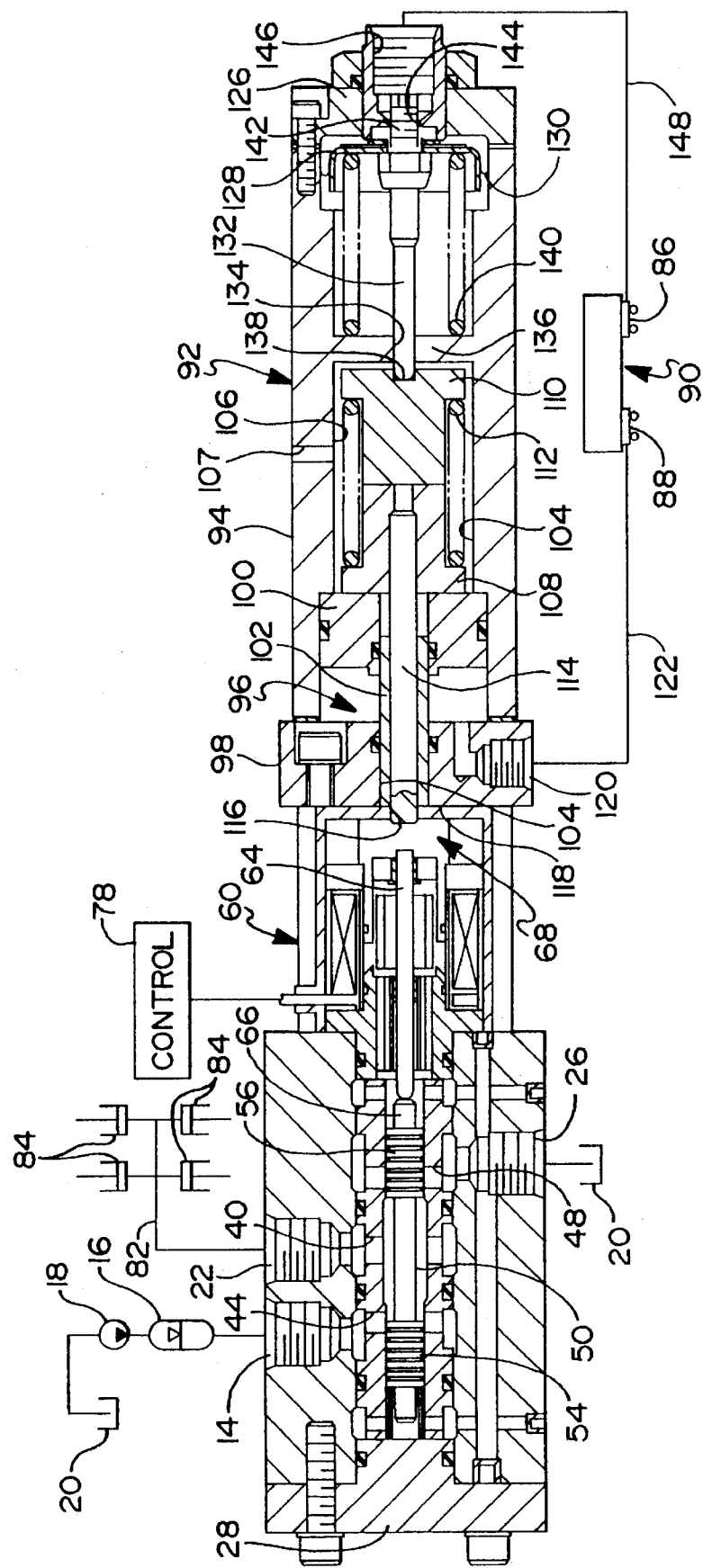
FIG. 5 is a view similar to FIG. 4, with the spool shown in fill position and the pneumatic controller held inoperative by brake pipe pressure.
Figure 6:
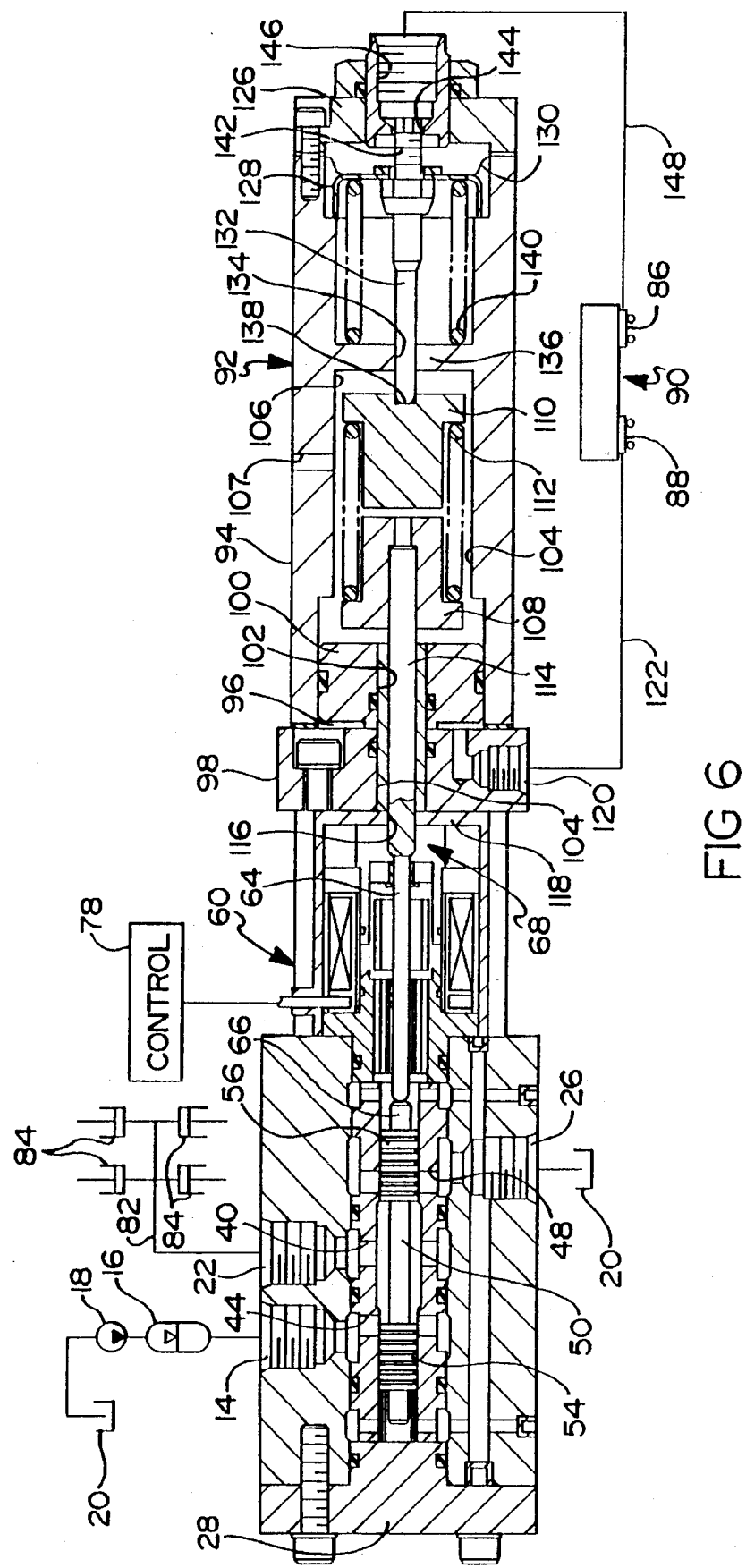
FIG. 6 is a view similar to FIG. 4, with the spool positioned in emergency brake apply position by the pneumatic controller; in emergency position.

FIGS. 4–6 illustrate another embodiment of a pressure control valve 80, according to this invention, in which parts identical to those of the FIG. 1–3 embodiment are identified by the same reference numerals. Here, pressure port 22 supplies hydraulic pressure fluid to a supply line 82 for cylinders 84 that operate disk brake calipers on trucks 86 and 88 of a transit car 90. Such a system is shown in greater detail in the aforementioned Jones patent.

A pneumatic actuator 92 is attached to the end of solenoid 60 and comprises a body 94 having an emergency pneumatic end chamber 96 closed by an end cap 98. A piston 100 is slidable in chamber 96 on a sleeve 102 which extends inwardly from a central opening 104 of end cap 98. Pneumatic chamber 96 opens into a smaller central chamber 106, vented at 107, that houses a flanged rod support 108 and a spring support 110 which confine a compression spring 112.

Spring 112 biases rod support 108 into contact with piston 100 and mounts an actuator rod 114 that extends through sleeve 102 and an opening 116 in the end wall 118 of solenoid 60. Chamber 96 is operatively connected through a port 120 to a conventional pneumatic emergency brake pipe 122 of transit car 90. When brake pipe 122 is charged, air pressure in chamber 96 overwhelms the force of spring 112 and drives piston 100 fully rightward to the position shown in FIGS. 4 and 5. This forces rod support 108 and rod 114 rightward out of contact with solenoid plunger 64.

A pneumatic load weigh chamber 124 is formed in the other end of pneumatic actuator body 94 and is closed by an end cap 126. A diaphragm support 128 mounts a diaphragm 130 that is confined between end cap 126 and actuator body 94, dividing chamber 124. An actuator pin 132 is mounted on diaphragm support 128 and extends through a hole 134 in a wall 136, which divides chambers 106 and 124, into a recess 138 of spring support 110. A compression spring 140 biases diaphragm support 128 rightward as guided by pilot pin 142 which slides along annular flange 144 of a pneumatic supply port 146. A pneumatic line 148 connects chamber 124 through port 146 with a conventional load weigh pneumatic bag (not shown) located in transit car truck 86. The pressure in the pneumatic load weigh bag and in line 148 is proportional to the passenger load carried by transit car 90, as is well-known.

In normal service braking, piston 100 is held rightward by the pressure in emergency brake pipe 122, holding actuator rod 114 out of contact with solenoid plunger 64. Thus, the force exerted by spring 112, and the load weigh force exerted by spring actuator pin 132 on actuator rod 114, via spring support 110 and spring 112, have no effect on the operation of valve spool 50.

Normal operation of pressure control valve 80 is similar to that described for the FIGS. 1–3 embodiment. As shown in FIG. 5, upon a call for braking, the controller 78 will signal solenoid 60 to shift spool 50 to its fill position. This will pressurize disk brake cylinders 84 to the desired pressure to apply the service brakes on transit car trucks 86 and 88 independent of pneumatic actuator 92. Hydraulic braking pressures for various braking levels are adjusted for car weight (load weigh) electrically through signals to controller 78, which adjusts current to linear solenoid 60. This electrical load weigh apparatus (not shown) is conventional and forms no part of this invention.

FIG. 6 illustrates operation of pressure control valve 80 under emergency conditions, which results from or in an electrical failure. A signalled emergency condition in transit car 90 will cause a venting, or "dumping", of brake pipe 122 in a well-known manner. This cuts current to linear solenoid 60 and vents chamber 96, allowing spring 112 to push piston 100 out of the way and move rod support 108 leftward. Actuator rod 114 will now engage solenoid plunger 64, forcing it and spool 50 to a fill position, connecting inlet port 14 with pressure port 22 to pressurize the disk brake caliper cylinders 84.

The force exerted on spool 50 by actuator rod 114 is affected by car weight, since a higher load weigh pneumatic bag pressure increases the force exerted by actuator pin 132 on spring support 110. In emergency, this increased force is transmitted via spring 112, rod support 108, actuator rod 114 and solenoid plunger 64 to spool 50. Thus, with the embodiment of FIGS. 4–6, car weight is effective in emergency to affect the hydraulic pressure in disk brake caliper cylinders 84.

Figure 7:
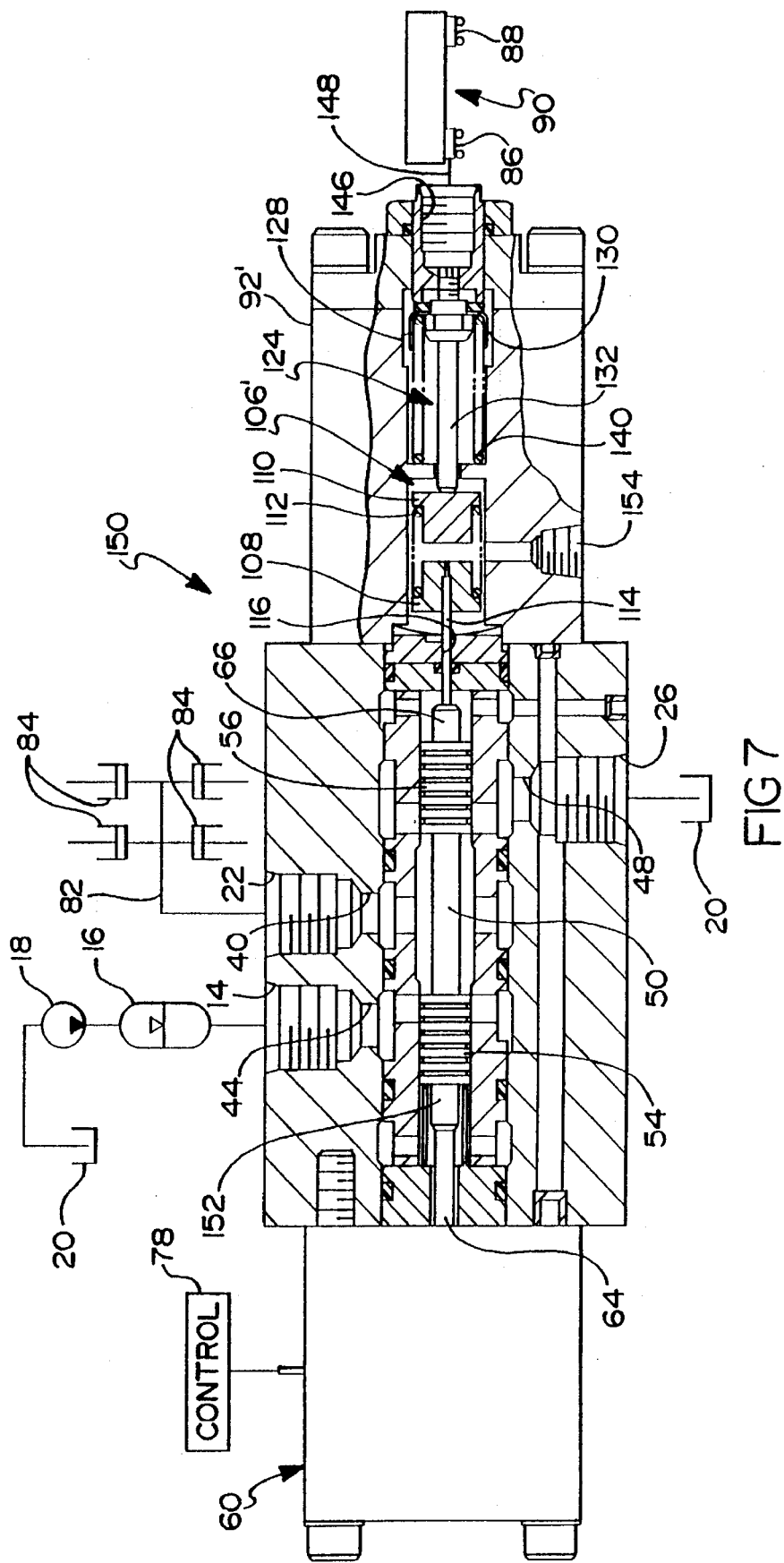
FIG. 7 is a sectional view of a further embodiment of a pressure control valve according to this invention, shown in a transit car hydraulic system and having a pneumatic controller, with the spool illustrated in neutral position.
Figure 8:
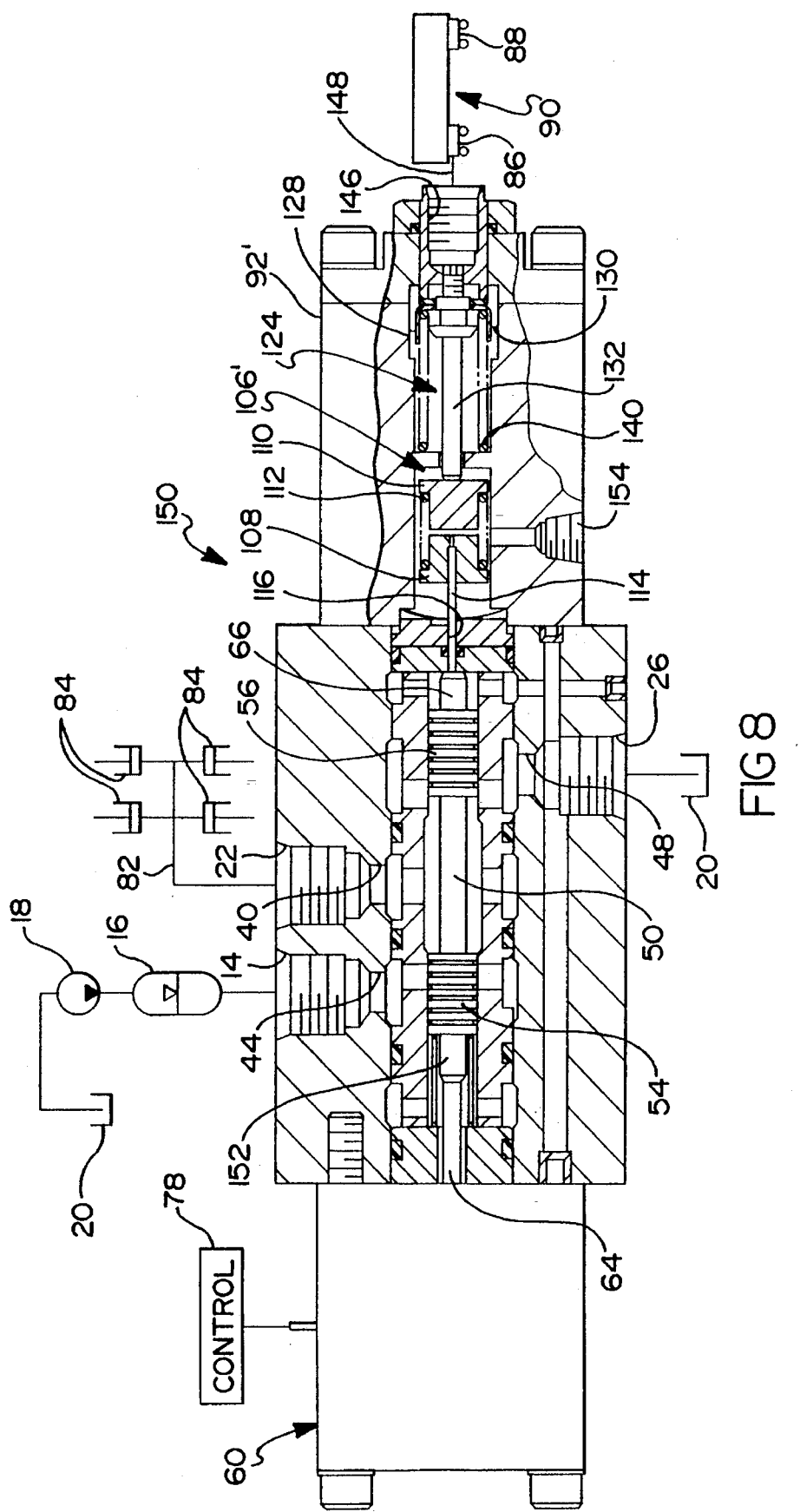
FIG. 8 is a view similar to FIG. 7, with the spool illustrated in brake release position.

A further embodiment of the pressure control valve 150 of this invention is illustrated in FIGS. 7–9, where parts identical to those of the FIG. 1–6 embodiments are identified by the same reference numerals, and similar parts are identified by the same reference numeral primed. In this embodiment, linear solenoid 60 is mounted on the other end of valve body 12, replacing end cap 28, so that plunger 64 engages the other end 152 of spool 50.

In this embodiment, the force of linear solenoid 60 is additive to the differential hydraulic force exerted on spool 50. This force is opposed by the force exerted by spring 112, which is effective during both normal service braking operation and emergency operation, since there is no brake pipe piston or pressure. Here, spring 112 and flanged supports 108, 110 operate in a chamber 106' that is vented to atmosphere through a vent port 154. Compensation for car weight is pneumatic in both service and emergency braking, since load weigh pneumatic pressure continuously affects the output force of actuator rod 114 on valve spool 50.

In operation, spool 50 is moved from the FIG. 7 neutral position to the brakes released position of FIG. 8 by reducing current to linear solenoid 60. Similarly, brakes are applied by increasing current to linear solenoid 60. Emergency conditions in transit car 90 result in a cutout of current to solenoid 60, so that pressure control valve 150 experiences emergency in the same manner as an electrical failure. As a result, there is no solenoid force, and the force on spool 50 is overwhelmed by the combined opposing forces of spring 112 and load weigh pneumatic pressure. This valve is inherently fail-safe.

This invention provides a pressure control valve which is energy efficient. Because of the differential area stepped spool and the linear solenoid used, only one amp of current is required to operate any embodiment of pressure control valve disclosed herein. In contrast, use of a conventional spool and a conventional solenoid would require 10–20 amps to operate. Thus, a small, relatively inexpensive linear solenoid can be used in place of a much larger, and more expensive, conventional solenoid.

In addition, all embodiments of the pressure control valve do not need a constant pilot fluid flow. Thus, use of the transit brake control valve embodiments, illustrated in FIGS. 4–9, drastically reduces the accumulator drainage as compared to the conventional arrangement shown in the aforementioned Jones patent. Testing with the WMATA braking system has indicated that the frequency of accumulator replenishment cycles is reduced to one per week, enabling use of a much smaller replenishment electric motor. This eliminates the problems experienced with accumulator bleed-down during transit car stoppage in a third rail gap.

The hydraulic pressures contemplated for use in the embodiments of this invention illustrated herein are in the range of 1000–1100 psi, although other valves according to this invention could be used with higher and lower pressures. With these pressures, the differential pressure force on the valve spool disclosed herein will be 14–15.4 lbs. In any specific application, the hydraulic pressure used and the specific solenoid characteristics will determine the spool land design to produce the appropriate differential area. While only a three preferred embodiments have been illustrated and described, obvious modifications thereof are contemplated within the scope of this invention and the following claims.

We claim:

1. A fluid pressure control valve for controlling brake operators in a transit car which has a pneumatic emergency brake pipe and a pneumatic load weigh device, the valve comprising a body having a stepped bore which has an inlet port connected to a source of pressure fluid, an outlet port connected to the brake operators, and a drain port connected to a hydraulic reservoir, a stepped spool slidable in the bore having opposed first and second valving lands, the first land having an effective area larger than the area of the second land by a differential area, the spool being movable between a fill position connecting the inlet and outlet ports and a drain position connecting the outlet and drain ports, the lands being exposed to outlet pressure fluid which biases the spool toward drain position by a first force produced by outlet fluid pressure acting on the differential area, and means for applying a second force to the spool opposing the first force to bias the spool toward fill position, including a selectively variable proportional linear electric device, a pneumatic brake pipe operator responsive to brake pipe pressure, and a load weigh operator responsive to vehicle weight, each independently operable to selectively vary the second force to selectively position the spool.

2. The fluid pressure control valve of claim 1, wherein the electric device is a proportional linear solenoid having an output rod engaging the spool with an opposing solenoid force that is proportional to current input and is substantially constant over the range of rod travel.

3. The fluid pressure control valve of claim 2, wherein the second force means includes a biasing device engaging the output rod to selectively increase the solenoid force.

4. The fluid pressure control valve of claim 3, wherein the biasing device includes a spring for increasing the solenoid force and control means for varying the spring force.

5. The fluid pressure control valve of claim 4, wherein the control means includes the load weigh operator which increases spring force with a load weigh force directly proportional to car weight.

6. The fluid pressure control valve of claim 5, wherein the brake pipe operator responds to the supply of brake pipe pressure to release the spring force and responds to the removal of brake pipe pressure to apply the spring force.

7. The fluid pressure control valve of claim 6, wherein the control means includes a mechanical adjustment for adjusting the spring force.

8. The fluid pressure control valve of claim 7, wherein the load weigh operator is responsive to a load weigh pneumatic pressure indicative of car weight to increase spring pressure in direct proportion to load weigh pneumatic pressure.

9. A fluid pressure control valve for controlling fluid pressure in a hydraulic device, comprising a body having a stepped bore which has an inlet port connected to a source of pressure fluid, an outlet port connected to the hydraulic device, and a drain port connected to a hydraulic reservoir, a stepped spool slidable in the bore having opposed first and second valving lands, the first land having an effective area larger than the effective area of the second land by a differential area, the spool being movable between a fill position connecting the inlet and outlet ports and a drain position connecting the outlet and drain ports, the lands being exposed to outlet pressure fluid which biases the spool toward drain position by a first force produced by outlet fluid pressure acting on the differential area, and means for applying a second force to the spool opposing the first force to bias the spool toward fill position including a biasing device including a spring engaging one end of the spool, pneumatic pressure responsive means responsive to a supply of pneumatic pressure to increase spring pressure in direct proportion to pneumatic pressure, and a selectively variable proportional linear solenoid having an output rod engaging the other end of the spool with a variable solenoid force, which is proportional to current input and is substantially constant over the range of rod travel, for selectively varying the second force to selectively position the spool and vary the fluid pressure in the hydraulic device.

10. The fluid pressure control valve of claim 9, wherein the biasing device includes a mechanical adjustment for adjusting the spring force.

11. A fluid pressure control valve for controlling brake operators in a transit car which has a source of pneumatic pressure that varies with car weight, the valve comprising a body having a stepped bore which has an inlet port connected to a source of pressure fluid, an outlet port connected to the brake operators, and a drain port connected to a hydraulic reservoir, a stepped spool slidable in the bore having opposed first and second valving lands, the first land having an effective area larger than the area of the second land by a differential area, the spool being movable between a fill position connecting the inlet and outlet ports and a drain position connecting the outlet and drain ports, the lands being exposed to outlet pressure fluid which biases the spool toward drain position by a first force produced by outlet fluid pressure acting on the differential area, and control means for applying a second force to the spool opposing the first force to bias the spool toward fill position, including a spring engaging one end of the spool, a pneumatic operator connected to the supply of pneumatic pressure and responsive thereto to increase spring pressure in direct proportion to car weight to selectively increase the second force, and a selectively variable proportional linear electric solenoid, having an output rod engaging the other end of the spool with a variable solenoid force which is proportional to current input and substantially constant over the range of rod travel, wherein the pneumatic operator and solenoid are each independently operable to selectively vary the second force to selectively position the spool.

12. The fluid pressure control valve of claim 11, wherein the control means includes a mechanical adjustment for adjusting the spring force.

13. A fluid pressure control valve for variably controlling the supply of pressure fluid to brake operators which operate the brakes in a transit car that has signalling means for signalling transit car conditions, one of which is an emergency condition, the valve comprising a body having a stepped bore which has an inlet port connected to a source of pressure fluid, an outlet port connected to the brake operators, and a drain port connected to a hydraulic reservoir, a stepped spool slidable in the bore having opposed first and second valving lands, the first land having an effective area larger than the area of the second land by a differential area, the spool being movable between a plurality of fill positions connecting the inlet and outlet ports and a drain position connecting the outlet and drain ports, the lands being exposed to outlet pressure fluid which biases the spool toward drain position by a first force produced by outlet fluid pressure acting on the differential area, control means for applying a variable second force to the spool which opposes the first force to bias the spool toward the fill positions, including a selectively variable proportional linear electric device and biasing means which produce forces that combine to provide the variable second force to move the spool to the plurality of fill positions, thus supplying pressure fluid at variable pressures to the brakes to provide a plurality of braking rates, and emergency means for maximizing the second force to move the spool to a fill position that supplies pressure fluid to the brakes to provide an emergency braking rate.

14. The fluid pressure control valve of claim 13, wherein the selectively variable proportional linear electric device is a proportional linear solenoid having an output rod engaging the spool with a force proportional to current input that is substantially constant throughout output rod travel, the solenoid output force variably opposing the biasing means force to provide the variable second force.

15. The fluid pressure control valve of claim 14, wherein the solenoid output force opposes the biasing force to produce the second force and the emergency means comprises signals received from the signalling means for halting current input to the solenoid to maximize the second force to supply pressure fluid to the brakes to provide the emergency braking rate.

16. The fluid pressure control valve of claim 13 wherein the transit car signalling means include load weigh means for signalling transit car weight, further including force adjustment means responsive to car weight signals received from the load weigh means to vary the second force and the supply of pressure fluid to the vehicle brakes in accordance with vehicle weight to produce a selected braking rate despite variations in transit car weight.

17. The fluid pressure control valve of claim 16, wherein the load weigh means include a source of pneumatic pressure which varies with car weight, the control means include a pneumatic operator connected to the supply of pneumatic pressure and responsive thereto to increase the second force in direct proportion to pneumatic pressure.

18. The pressure control valve of claim 13, wherein the signalling means comprise a pneumatic brake pipe having a pressure, and the emergency means comprise means for applying a variable spring force to the spool to move the spool to a fill position that supplies pressure fluid to the brakes to provide the emergency braking rate, and an operator responsive to brake pipe pressure, wherein the brake pipe operator responds to the removal of brake pipe pressure to apply the spring force, and responds to supply of brake pipe pressure to remove the spring force.

19. The fluid pressure control valve of claim 18, wherein the control means include a mechanical adjustment for adjusting the biasing means to selectively vary the second force.

20. The fluid pressure control valve of claim 13, wherein the biasing means includes a spring applying a spring force to one end of the spool and the control means include a mechanical adjustment for adjusting the spring to selectively vary the second force.

21. The fluid pressure control valve of claim 20, wherein the electric device is a proportional linear solenoid having an output rod engaging the other end of the spool with a variable solenoid force, the solenoid force being proportional to current input and substantially constant over the range of rod travel.

22. The fluid pressure control valve of claim 20, wherein the transit car signalling means include a pneumatic operator connected to a supply of pneumatic pressure and responsive thereto to increase the spring force on the spool in direct proportion to pneumatic pressure.

23. The fluid pressure control valve of claim 22, wherein the pneumatic pressure varies with transit car weight to vary spring force and vary spool position to produce a selected braking rate despite variations in transit car weight.

* * * * *